(12) United States Patent
Newnam et al.

(10) Patent No.: US 7,886,003 B2
(45) Date of Patent: Feb. 8, 2011

(54) SYSTEM AND METHOD FOR CREATING INTERACTIVE EVENTS

(75) Inventors: Scott G. Newnam, Cambridge, MA (US); Izet Fraanje, Manhattan Beach, CA (US); Ronald Tache, Middleton, MA (US); Andrew J. Borleske, Garner, NC (US); Douglas T. Neumann, Cary, NC (US)

(73) Assignee: Ericsson Television, Inc., Duluth, GA (US)

( * ) Notice: Subject to any disclaimer, the term of this patent is extended or adjusted under 35 U.S.C. 154(b) by 0 days.

(21) Appl. No.: 12/113,909

(22) Filed: May 1, 2008

(65) Prior Publication Data

US 2009/0094632 A1    Apr. 9, 2009

Related U.S. Application Data

(63) Continuation of application No. 09/899,827, filed on Jul. 6, 2001, now abandoned.

(51) Int. Cl.
*G06F 15/16* (2006.01)

(52) U.S. Cl. .................... 709/204; 725/60; 725/61; 725/30; 715/731; 715/722; 715/714

(58) Field of Classification Search .............. 725/30; 715/731
See application file for complete search history.

(56) References Cited

U.S. PATENT DOCUMENTS

| | | | |
|---|---|---|---|
| 5,517,257 A | 5/1996 | Dunn et al. | |
| 5,537,141 A | 7/1996 | Harper et al. | |
| 5,539,822 A | 7/1996 | Lett | |
| 5,589,892 A | 12/1996 | Knee et al. | |
| 5,638,113 A | 6/1997 | Lappington et al. | |
| 5,695,400 A | 12/1997 | Fennell, Jr. et al. | |
| 5,734,413 A | 3/1998 | Lappington et al. | |
| 5,774,664 A | 6/1998 | Hidary et al. | |
| 5,778,181 A | 7/1998 | Hidary et al. | |
| 5,848,352 A | 12/1998 | Dougherty et al. | |
| 5,930,765 A | 7/1999 | Martin | |
| 5,987,525 A | 11/1999 | Roberts et al. | |
| 6,006,256 A | 12/1999 | Zdepski | |
| 6,007,426 A | 12/1999 | Kelly et al. | |
| 6,018,768 A | 1/2000 | Ullman et al. | |
| 6,061,719 A | 5/2000 | Bendinelli et al. | |
| 6,161,137 A | 12/2000 | Ogdon et al. | |
| 6,173,332 B1 | 1/2001 | Hickman | |
| 6,193,606 B1 | 2/2001 | Walker et al. | |
| 6,209,028 B1 | 3/2001 | Walker et al. | |
| 6,215,526 B1 | 4/2001 | Barton et al. | |
| 6,233,389 B1 | 5/2001 | Barton et al. | |
| 6,239,793 B1 | 5/2001 | Barnert et al. | |
| 6,240,555 B1 * | 5/2001 | Shoff et al. | ........ 725/110 |
| 6,263,505 B1 | 7/2001 | Walker et al. | |
| 6,331,144 B1 | 12/2001 | Walker et al. | |
| 6,414,635 B1 | 7/2002 | Stewart et al. | |
| 6,421,706 B1 | 7/2002 | McNeill et al. | |
| 6,426,778 B1 | 7/2002 | Valdez, Jr. | |
| 6,460,180 B1 | 10/2002 | Park et al. | |
| 6,526,335 B1 | 2/2003 | Treyz et al. | |
| 6,728,753 B1 | 4/2004 | Parasnis et al. | |
| 6,799,327 B1 | 9/2004 | Reynolds et al. | |

(Continued)

*Primary Examiner*—Duyen M Doan (57) ABSTRACT

An interactive Internet-based system and method provides a number of components that can be used to provide interactivity, including chat, polling, and trivia functionalities, particularly for use in enhancing other events, such as television programs.

14 Claims, 6 Drawing Sheets

U.S. PATENT DOCUMENTS

| | | |
|---|---|---|
| 7,028,324 B2 * | 4/2006 | Shimizu et al. ............... 725/32 |
| 7,028,327 B1 | 4/2006 | Dougherty et al. |
| 7,222,155 B1 * | 5/2007 | Gebhardt et al. ............ 709/204 |
| 2001/0001160 A1 | 5/2001 | Shoff et al. |
| 2001/0032132 A1 | 10/2001 | Moran |
| 2002/0023230 A1 | 2/2002 | Bolnick et al. |
| 2002/0054750 A1 | 5/2002 | Ficco et al. |
| 2002/0100039 A1 | 7/2002 | Iatropoulos et al. |
| 2002/0103696 A1 * | 8/2002 | Huang et al. ................... 705/12 |
| 2002/0124249 A1 | 9/2002 | Shintani et al. |
| 2002/0129381 A1 | 9/2002 | Barone et al. |
| 2002/0133562 A1 | 9/2002 | Newnam et al. |
| 2002/0143901 A1 | 10/2002 | Lupo et al. |
| 2002/0162117 A1 | 10/2002 | Pearson et al. |
| 2002/0162118 A1 | 10/2002 | Levy et al. |
| 2005/0015796 A1 | 1/2005 | Bruckner et al. |

* cited by examiner

SYSTEM AND METHOD FOR CREATING INTERACTIVE EVENTS

CROSS-REFERENCE TO RELATED APPLICATION(S)

This application is a continuation of U.S. patent application Ser. No. 09/899,827, filed Jul. 6, 2001, the disclosures of which is hereby incorporated by reference in its entirety for all purposes.

BACKGROUND OF THE INVENTION

The present invention relates to a system and method for creating interactive events.

Interactive entertainment has existed for several years in the forms of video games and computer games. Using the Internet, users can compete in multi-player games using computers and Web-enabled consoles. The fast penetration of the Internet into the majority of U.S. households has provided a sudden increase of interactive content and the ability for end-users to interact, and has promoted the popularity of interactive Internet programming for education and entertainment.

Interactive Internet programming is applicable in a variety of markets, such as the interactive entertainment market. Currently, interactive entertainment is delivered either via the TV with side-by-side personal computer ("enhanced broadcasting") or the personal computer alone ("online interactive entertainment"). Enhanced broadcasting, providing data that supplements a video broadcast, enables consumers to purchase products or request product information (e.g., literature, coupons, or sample merchandise), access additional information (e.g. news, sports, or weather), or otherwise interact with television programming (e.g. TV game shows or polls). Enhanced broadcasting can be provided solely over the television; in a simple form, enhancement may include closed captioning, but there are other methods by which a user can get additional information over the TV and interact, e.g. through a remote control.

Due to the market penetration of the personal computer, a significant amount of interactive entertainment is delivered via the personal computer. As the penetration of broadband Internet connectivity increases and platform development continues, interactive entertainment may migrate to the TV with a web-enabled television, a set-top box, or an Internet-connected console. Additionally, some interactive programming, such as simple game applications, may be available on handheld devices via the Wireless Application Protocol (WAP) and on future Internet devices.

The likely convergence of television and the Internet, and the growing demand for interactive entertainment, has created a need for interactive programming that encourages the evolution of entertainment from passive television to the types of interactive entertainment that will be possible once broadband Internet access and digital television are ubiquitous.

SUMMARY OF THE INVENTION

The system and methods of the present invention are for creating interactive events that run on or with existing or future interactive entertainment and television systems and enhance broadcast programming (over a TV, radio, Internet, or other medium). An embodiment of the present invention includes at least some of the following components: a composer that has authoring tools and is capable of generating multimedia events; a content tool, which is an interface used to insert content into the interactive events generated by the composer; a simulator for testing a completed event; and a technical director for directing the timing and display of the content within the event. The system can be customized so that completed interactive event output files make up the required components for events on various interactive television systems.

An example of an interactive television system that could run the events created with the present invention is a system in which there is a user-based hardware device with a controller (such as a personal computer), server-based interactive components, and a technical director for interacting with the server components and the user-based hardware device via the server. For an interactive television application, the type of event and instance of that event would be a program and specific episodes, respectively.

The content creation components of the present invention create output files specific to the event or program being created, and also output files specific to certain instances of a recurring event or episodes of a program. The event and episode could be combined into one, such as for a specific movie or sporting event. The interactive events contemplated by the present invention can include several different types of interactive components, all of which can be customized and populated with content using the system and method of the present invention.

A content creation system according to an embodiment of the present invention preferably has a graphical interface that is convenient for event developers to use to create pieces of the interactive event, such as through drag and drop icons and drop down menus, yet rapidly creates the code necessary to interface with code used by the interactive television and other entertainment systems to provide rich interactivity. The composer allows event developers to quickly and cost-effectively create events. The composer creates both client components and server components such that a producer with the technical director on the server side can control the interactive enhanced content. The client and server components are preferably created at the same time when the producer uses the content creation tools. The content can be scheduled for display on a client's television or monitor for a specific time, created for future use at the discretion of a producer, downloaded in advance and responsive to a message from the technical director, downloaded during the event but in advance for display during that event rather than for instant display, or stored at the server side for transmission at a later time.

An example of an interactive component customized with the system is interactive community building functionality such as chat and instant messaging. Event developers can use the system to select from various options available for chat functionality, including incorporating instant messaging, allowing users to create "buddy lists" to create private chat rooms, determining the names of themed rooms, and determining the number of users per room.

The system of the present invention can create other types of interactive processing including the following: (i) real-time, interactive question-and-answer-based games (e.g., trivia) or other games wherein a multitude of users compete against each other in real time; (ii) real-time voting and polling wherein audience members vote to determine broadcast content (e.g., choose-your-own-adventure) or provide their opinion on broadcast content (e.g., issues polling) and (iii) instantaneous reporting of game, voting, and polling results. The system can also be used to create games playable by the user without interaction with a server.

A developer of the interactive event can designate time and space intervals for animated movies, audio, video streams, participant polls, games, and messages using the composer and/or content tool. The animated movies, audio, video streams, poll text, trivia question and answer text, and messaging text can be added to the event using the content tool.

Spontaneous content can also be provided live (on the fly). During the event, the technical director controls the timing of the content display and the addition of spontaneous content. Participants of the event can participate in chat rooms and send messages back to the host producer. The producer can change content or generate new content based on the questions and comments from the users or the course of a live event. Because the components and the content of interactive events vary, the options available in the technical director will likewise vary. The content creation system according to an embodiment of the present invention uses the composer to generate a customized technical director.

Interactive events created by the present invention can (i) allow users to impact the programming in real-time; (ii) allow users to communicate with a producer of the programming; (iii) allow users to interact with each other; (iv) scale to a television-sized audience; (v) provide users with a similar experience regardless of modem speed; and (vi) maintain synchronization among users.

The invention can be used to provide advertising and e-commerce. The system's capacity to support advertising and e-commerce encourages additional commerce. The present invention enables advertising that unites the best of television and Internet models by uniting interactivity with broad reach. Users can request information on demand, enabling advertisers to create powerful, customized messages that influence consumer-purchasing behavior.

All the interactive functionality/content such as polls, games, chat, audio, and advertisements can be synchronized with each other. The present invention also includes other interactive mechanisms, for example, to (i) highlight a picture of the person whose voice is currently in the audio stream, (ii) play a video clip related to the trivia question currently being displayed, or (iii) display a graphic related to the subject of a poll.

Other features and advantages will become apparent from the following detailed description, drawings, and claims.

DETAILED DESCRIPTION

A content provider, such as a television network, can broadcast television programming to a television via cable, satellite, over-the-air, or other means. The program that is broadcast is a type of event, and the episodes are instances of that event. Events could be broadcast by other means, such as over the Internet or via radio.

Before an episode, the system of the present invention allows a broadcaster to develop interactive content and to send that content to a user's hardware device using the Internet infrastructure. During the episode, the broadcaster can send messages using available communication protocol to control the content being displayed, including both content sent before the broadcast and content created during the broadcast.

When the system of the present invention is used to enhance television broadcasting content, the first time that the user uses the system, the user downloads a client base, which is a general program for controlling this type of interactivity; client program for the particular program being enhanced; and a client episode for the next episode of the program. The base software includes code that manages the system and interacts with server components, including providing and displaying chat messages and handling different message types for display to the user.

The base software need not be downloaded or flashed; certain programs residing on a user's hardware (e.g., certain browsers on a user's PC) can serve as this base software, or the base software could be written in to an operating system, such as on a set top box or net top box (e.g., WebTV).

The client program content can include images that will be displayed with a particular event whenever that event is enhanced with the system of the present invention. For example, this content can include a background display to be shown on the monitor or television and can include other information, such as biographical information about actors that does not change from episode to episode. This content, as with the client base, need not be initialized for each episode (although enhancements and updates could be re-initialized).

The episode content that is downloaded or flashed down can include content relating to the specific episode of the program being shown and can include, in advance, fun facts, trivia questions, or other items that can be accessed. In a cooking show, for example, the episode content could include recipes that will be made during that episode, and can include additional recipes to further enhance the televised content. The episode content can include a time-out feature that causes the episode content to be deleted at the end of the episode. If a user wants to watch a future episode, the user can initialize the relevant episode content before or during that next episode.

An event component portion of the server is responsible for interactive processing for activities, such as games, polls, and fun facts. The server can communicate with the client to trigger display of content through different types of messages. The messaging layer minimizes data transfer during the program. For example, if the event component sends the following message: "2, Who holds the record for most home runs in a season?, Micky Mantle, Babe Ruth, Mark McGwire, Sammy Sosa", the client will recognize the message as a message type 2 (in this case, meaning trivia question) and display the text "Who holds the record for most home runs in a season?" as a trivia question and display the four choices that follow as possible answers in a desired format, such as with clickable numbered text boxes. Alternatively, if the event component sends the message "3, Who is the best hitter of all time?, Micky Mantle, Babe Ruth, Ted Williams", the client will recognize it as message type 3 (in this case, a poll) and display the information as a poll, such as with radio buttons. The client displays these types of interactivity in a desired way, and with captions in the boxes in which they are displayed, based on the message type received. For example, a trivia question might display points or include a clock that counts down with a change in points; a poll might only have a timer.

The client can send back the answer to the trivia question or poll based on a defined occurrence, such as after a predetermined amount of time, when the user inputs the answer, or when the producer requests the results from the client using the technical director. In all cases, the client sends the message back to the event component. The event component receives and aggregates results and sends them back to the clients. In most cases in which information is sent back as a response, the time for responding is short relative to the event, e.g., 60 seconds or 30 seconds or less. This allows the answer or poll result, for example, to be broadcast to all users without long waiting times. For trivia, the system can then display a leader board with a variable number of top scores.

The content that is created can be provided to the user in advance of the event, provided in part in advance of the event, provided in the background during the event for display subsequently during the event, or provided live and "on the fly" during the event for immediate display. Graphics, for example, and other relatively high data content materials would generally be provided in advance of the event or in the background during the event for display later during the event; the graphics are then displayed in response to a short message from the server. In the case of polls, fun facts, or other low data content such as text lines, a producer can type the poll or fun fact into the technical director to provide that poll or fun fact to users on the fly. The producer could simply develop the idea for a poll or fun fact during the programming, or the poll or fun fact could be created in response to other poll results or other comments received from viewers during the event. This capability thus demonstrates how the interactivity does not necessarily just scheduled in advance, but is also capable of evolving during the programming.

The polls, trivia questions, and other items of such interactive functionality can be scheduled for specific times, queued for display in response to some message, or stored at the server side for transmission when desired by the producer through the technical director. If scheduled in advance, the poll or trivia question is preferably arranged for a time during a programming segment. Television programs and movies shown on television tend to be broken into segments of known content and duration. The exact timing of such display may not necessarily be known because of changes that can occur due to last minute reinsertion or removal of advertising by the broadcaster, or because other programs could cause one program to be early or late. Control display based on segments could specify, for example, that a particular poll be displayed at two minutes after the beginning of the third segment. Alternatively, the polls can be queued for display such that the server effectively sends a message requesting the next poll question or next trivia question for other component, in which case that next one is displayed. Questions can also be created and stored at the technical director at the server end for transmission on the fly, and, as indicated above, the content can be both created and transmitted on the fly, such as in conjunction with the response of users to the event and the interactivity.

Other interactive capabilities, as indicated above, include the ability of viewers to chat with each other or to interact with the producer via questions or comments. Viewers can then supply proposed trivia questions or poll questions.

Figure 1:
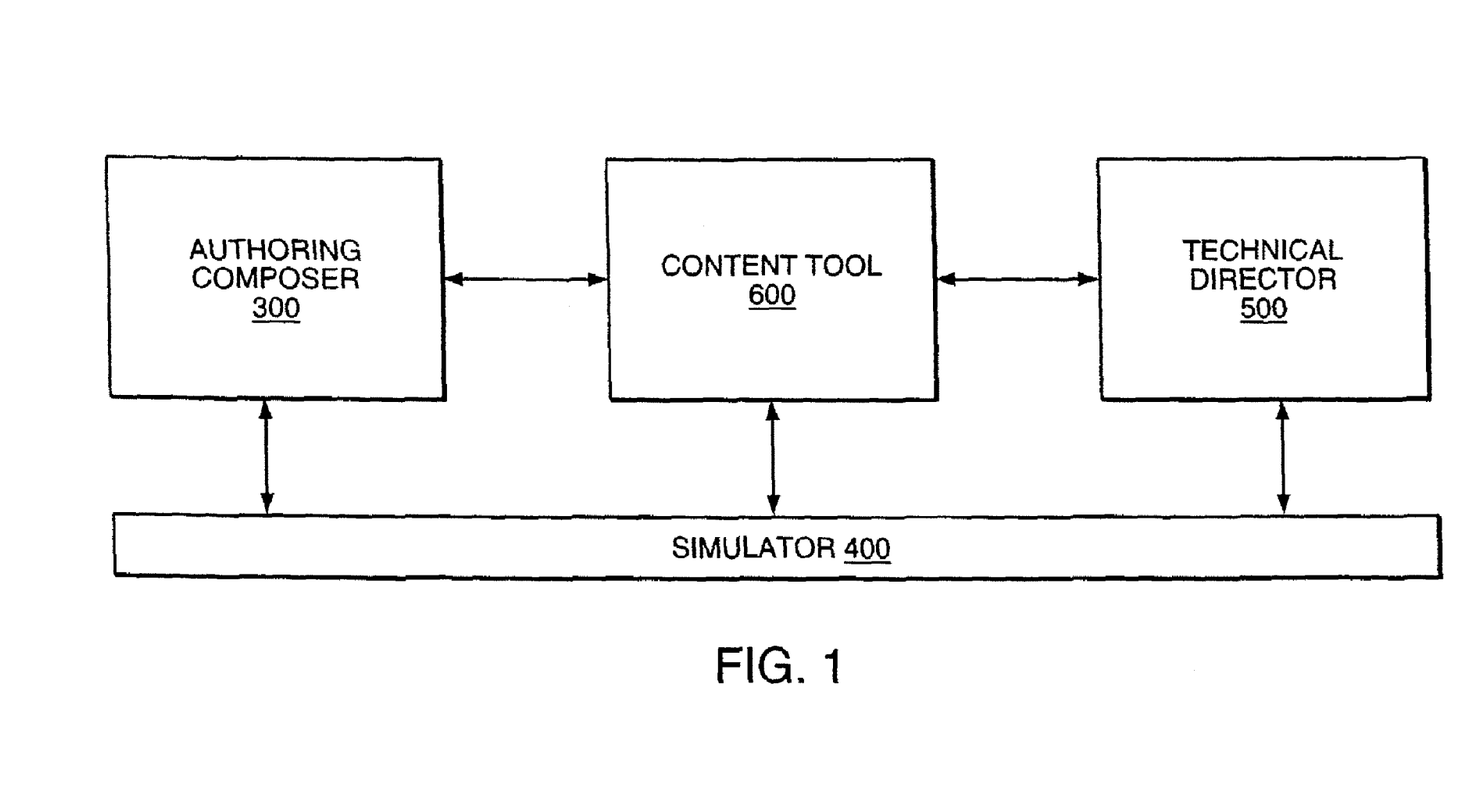
FIG. 1 is a block diagram of an event-creation system showing the composer, content tool, technical director and simulator.

FIG. 1 shows components of an embodiment of a system according to the present invention for creating content and an interactive event generally. An authoring composer 300 is a software program residing on a computer and is the basis for the event creation process. The authoring composer 300 has tools, responsive to a content creator, to allow the content creator to create interactive events to enhance programming. Such tools can include convenient drag-and-drop icons and drop down menus. The authoring composer 300 allows producers (or those working with or for broadcasters) to produce a skeleton event. This production can include some or all of the following: identifying segments in the event, determine interactive functionality in the different segments, such as chat between viewers, interactive communication with the producer, trivia, polling, and fun facts, and also setting the visual appearance of the event.

The content tool 600 is used to collect and create episode specific content for an event scheduled in the future. Content tool 600 is a software interface, such as a web page, on a computer and resides between a producer of the event, such as a television broadcaster, and the server system. The content tool 600 allows users to produce and store content for a specific episode of a series of events.

The technical director 500 is a software interface, such as a web page, on a computer, and is accessible to the producer during an event to interact with the system and to monitor and control the event. The technical director 500 allows a producer to control the content of the event in real-time by enabling the producer to change the content based on input from the users. The technical director 500 can also, for example, receive questions, display questions and comments, and allow the producer to select questions posed to the producer for display to solicit comments from viewers. The producer can respond to the questions or comments through the real-time creation of event content. The new content could be multimedia content distributed by a broadcaster or content created by the technical director 500. For example, the technical director 500 allows producers to generate real-time content (e.g., a real-time fun fact or poll) and to cause the display of such content.

The simulator 400 allows event developers using the system to test events and or episodes created in their own environment (e.g., desktop computer). It provides mechanisms to simulate the interactive entertainment/television system on which the event will be running. The simulation is designed to provide a high level of reliability.

Figure 2:
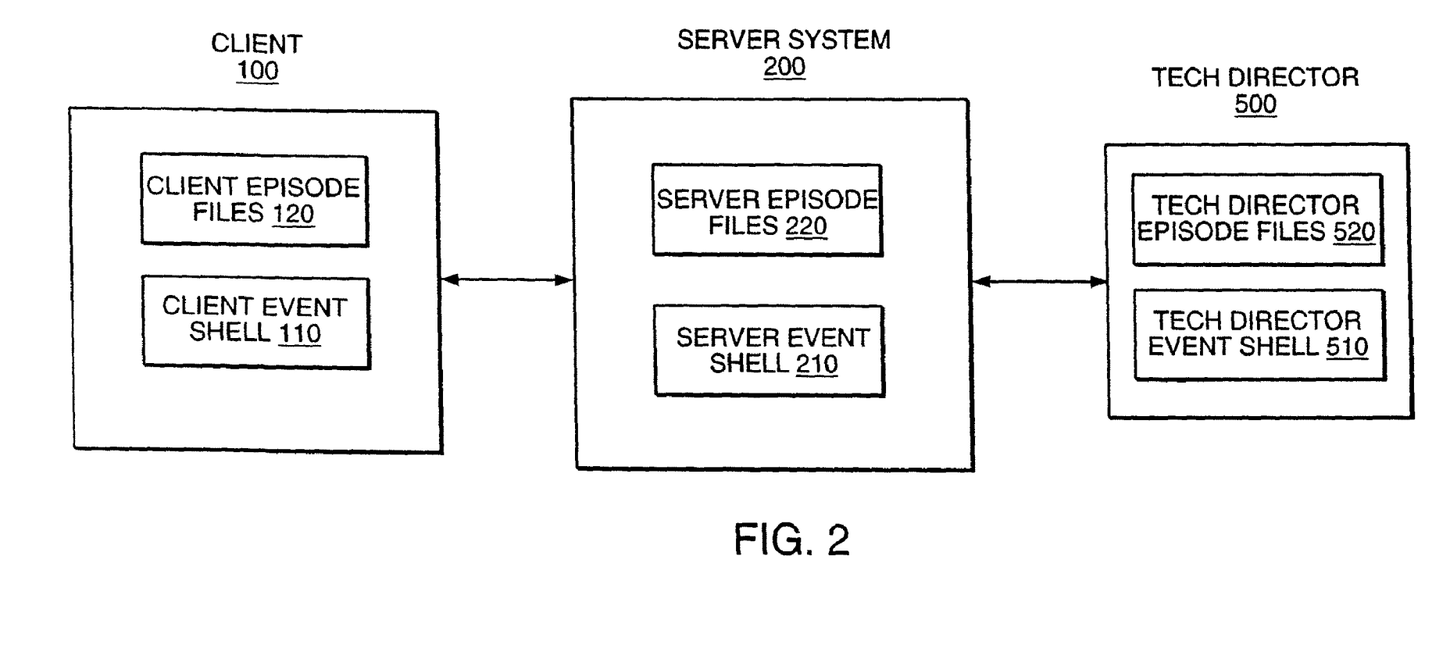
FIG. 2 is a block diagram of an exemplary implementation of event specific content components that are generated by authoring tools on the client, server system and technical director side.

As shown in FIG. 2, an embodiment of the present invention has several components that are generated to create a specific event. The underlying interactive system that provides the infrastructure to actually run events generally includes a client 100, a server system 200, and the technical director 500. The client software runs on an end-user hardware device, such as a home computer or set top box.

An event may have a series of episodes that have common features but with content or specific implementation that can change across multiple episodes. In the client 100, there is a client event shell 110 that defines the features and contains graphics and behavior that are constant across multiple episodes, i.e., the general program content. The client episode files 120 are the elements on the client side that each relate to a specific episode. Examples of elements in the client event shell 110 include a background graphic that is present in each of the episodes and biographical information about individuals who appear regularly in multiple episodes. The client episode files 120 contain, for example, the specific graphics for an episode (e.g., advertisements) that are typically downloaded in advance of the broadcast. These can include banners that can be clicked by the user if desired. The elements in client event shell 110 can be reused for future episodes and thus do not have to be initialized for each event, although they may be updated during a download or flashing process.

Parallel to the client 100 and within the server system 200 is a server event shell 210 that defines the specific features of an event. An example of a feature that is defined in the server event shell 210 is a chat server component. If chat is included in the server event shell 210, the server system 200 will provide this functionality. The server episode files 220 define the specifics for that episode, e.g., the names of the chat rooms for that episode.

The tech director 500 has a tech director event shell 510 and tech director episode files 520 that respectively define the event and the specific episode within the event similar to the client 100 and server system 200. The tech director event shell 510 can, for example, define the availability of polls in a segment of the event, while the tech director episode file 520 contains the specific content for a poll in a segment.

As described above, content for a specific episode can reside in three locations: the client episode files 120 on the client 100, the server episode files 220 on the server system 200, and the tech director episode files 520.

Figure 3:
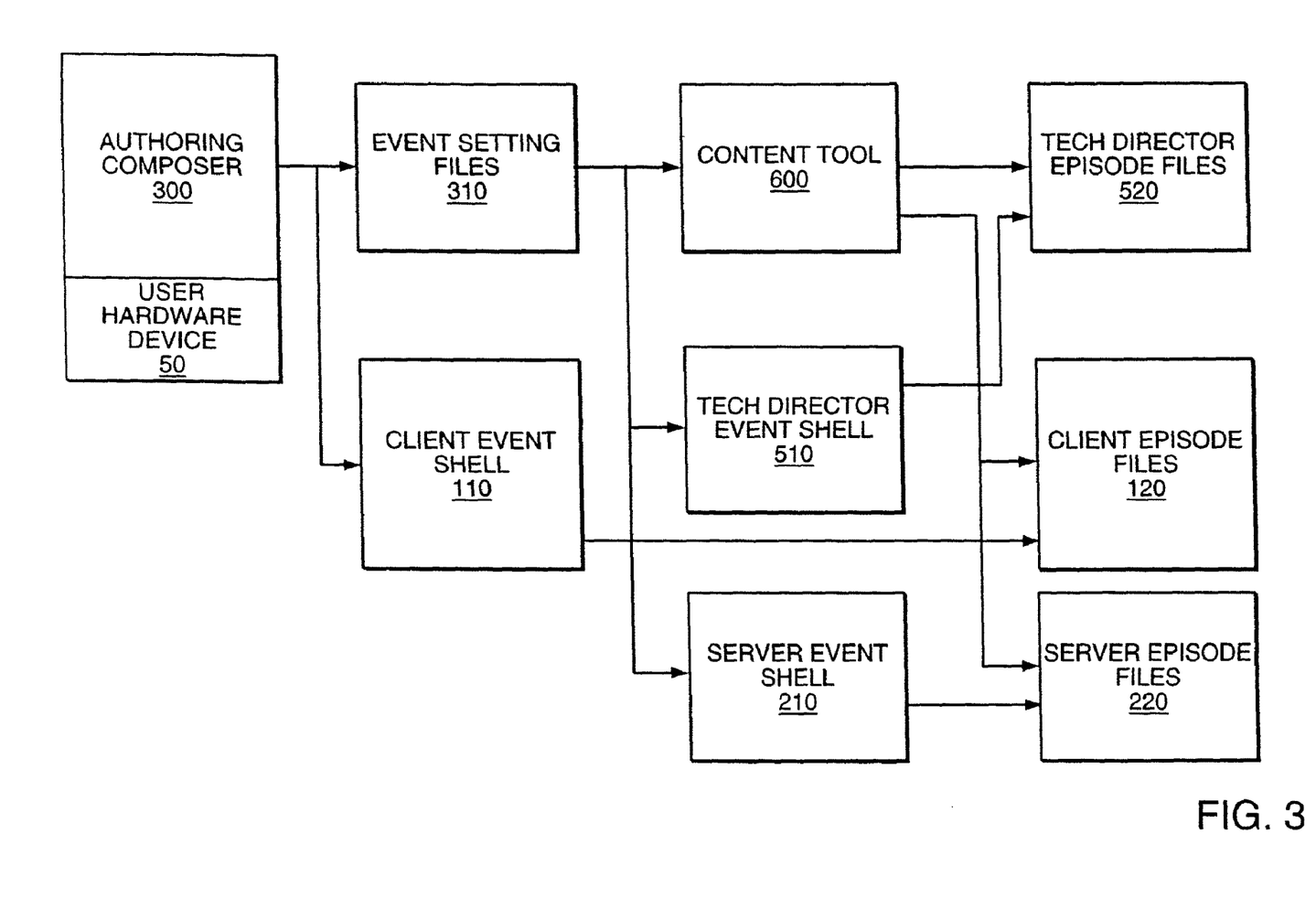
FIG. 3 is a flow diagram of the authoring tools and the output of the authoring tools that create an event.

FIG. 3 shows an exemplary implementation of the system of FIG. 1 in more detail, including a flow for the authoring tools and how the event-specific and episode-specific files are created. The authoring composer 300 generates a specific event (and series of episodes within this event) on the underlying system. The authoring composer 300 is an application that runs on a hardware device 50 such as a producer's computer. Composer 300 allows users to drag and drop components, insert behaviors and graphics, insert text, and perform other tasks to make up an event.

While the producer is using the pull down menus, and drag and drop icons of the graphical interface of the authoring composer 300 to create an event, the authoring composer 300 is creating event setting files 310 and the client event shell 110. The event setting files 310 convey information about the newly created event that is used by the system to create customized versions of the content tool 600, the tech director event shell 510, and the server event shell 210. The event setting files 310 relate to the features, behavior, images, and other aspects of the newly created event. Some information in the event setting files 310 is used by the system to generate a content tool 600 with fields for inserting the content required for the newly created event. Further, some information in the event setting files 310 is used by the system to generate server event shell 210, server code necessary for the functionality of that specific event. Finally, some information in the event setting files 310 is used by the system to create a tech director event shell 510 that contains the buttons and fields used to control the newly created event. The producer then inserts the content for each episode into the content tool 600. This content will then be exported and converted into the episode specific files, namely, tech director episode files 520, client episode files 120, and server episode files 220.

In another embodiment, the components of FIG. 3 can be generated in a different order or different combination.

Figure 4:
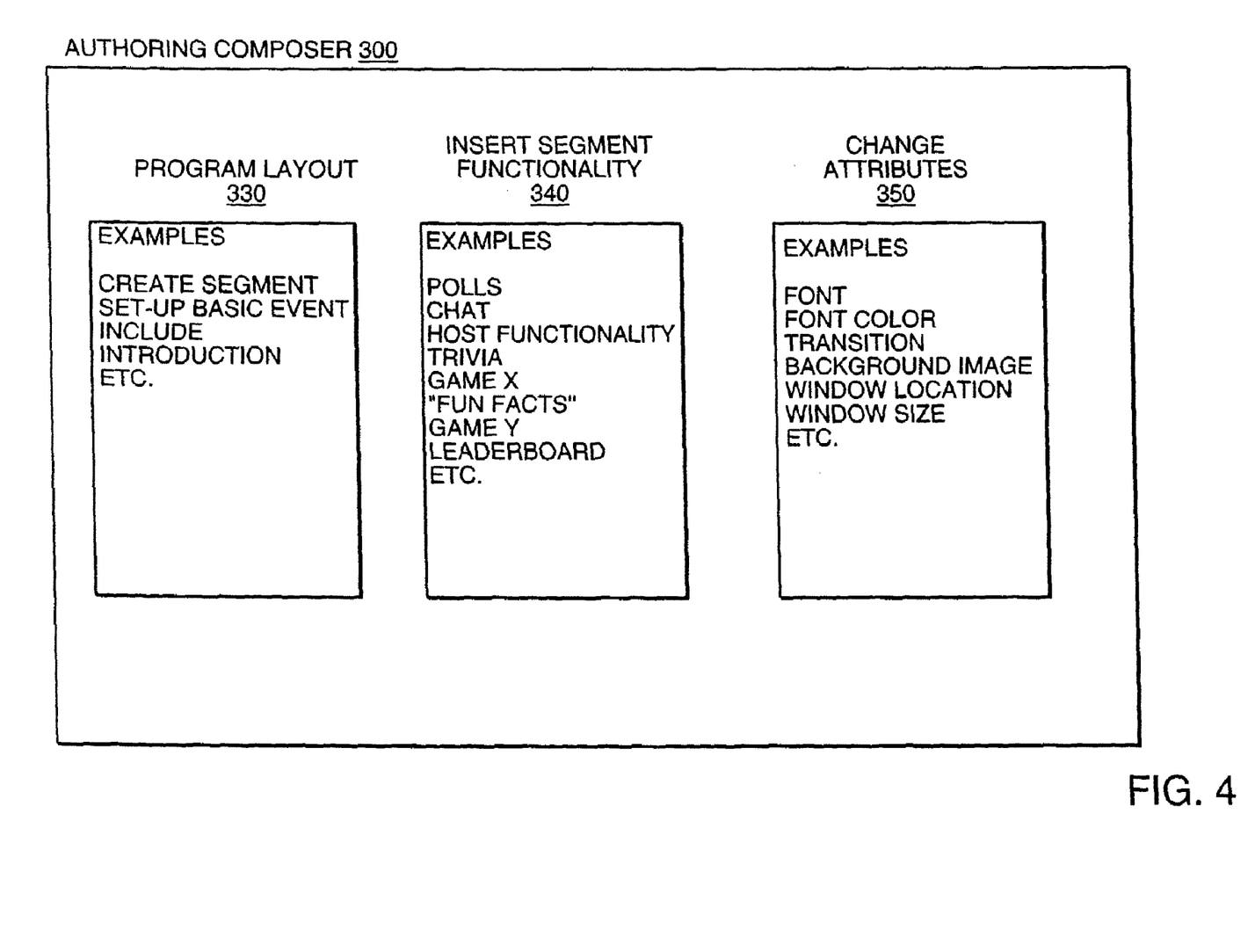
FIG. 4 shows an example of the composer and some of its components.

FIG. 4 shows an example of an implementation of the authoring composer 300. The producer can lay out a storyboard for an event or episode using a program layout 330 section. Easy to use drag-and-drop menus of different program options are presented to the producer to create the segments and perform other tasks.

An insert segment functionality 340 is used to determine the functionality that can be used for each of the segments. The producer can, for example, decide to turn on the chat functionality in the introductory segment and continue throughout or turn off in a later segment, send certain fun facts in segment #2, send five trivia questions in segment #3, provide a combination of polls and trivia in segment #4, etc.

The producer can thus indicate a segment #1 and enable a variety of interactive component elements and capabilities during that segment. For example, the producer can turn on the chat functionality, turn on the ability of users to provide comments and ask questions to the producer, and then can enable a number of polls, trivia questions, and fun facts. As indicated above, each of these functionalities can be turned on or off through a user interface with drop down menus or drag and drop icons, such that the chat feature is dragged into the segment causing that feature to be activated, and polls, fun facts, and trivia questions can have separate icons used to enable them.

Change attributes 350 allows the producer to further tailor the look and feel of the event across multiple episodes. It provides the mechanism to determine the size of windows, change fonts and font colors, insert (background) images, and further design transitions. This includes, for example, how trivia and poll questions will be displayed, what the chat box looks like, and positioning of boxes being displayed. The images can include graphics that can be imported from saved files, and can be, for example, jpg images.

As the producer creates the functionality for all of the segments for the programming through the user interface of the authoring composer, the system generates the corresponding event setting files 310 and client event shell 110 as shown in FIG. 3 and discussed above.

At this time, a simulation can be run to see how the text boxes and background will appear during the event.

Figure 5:
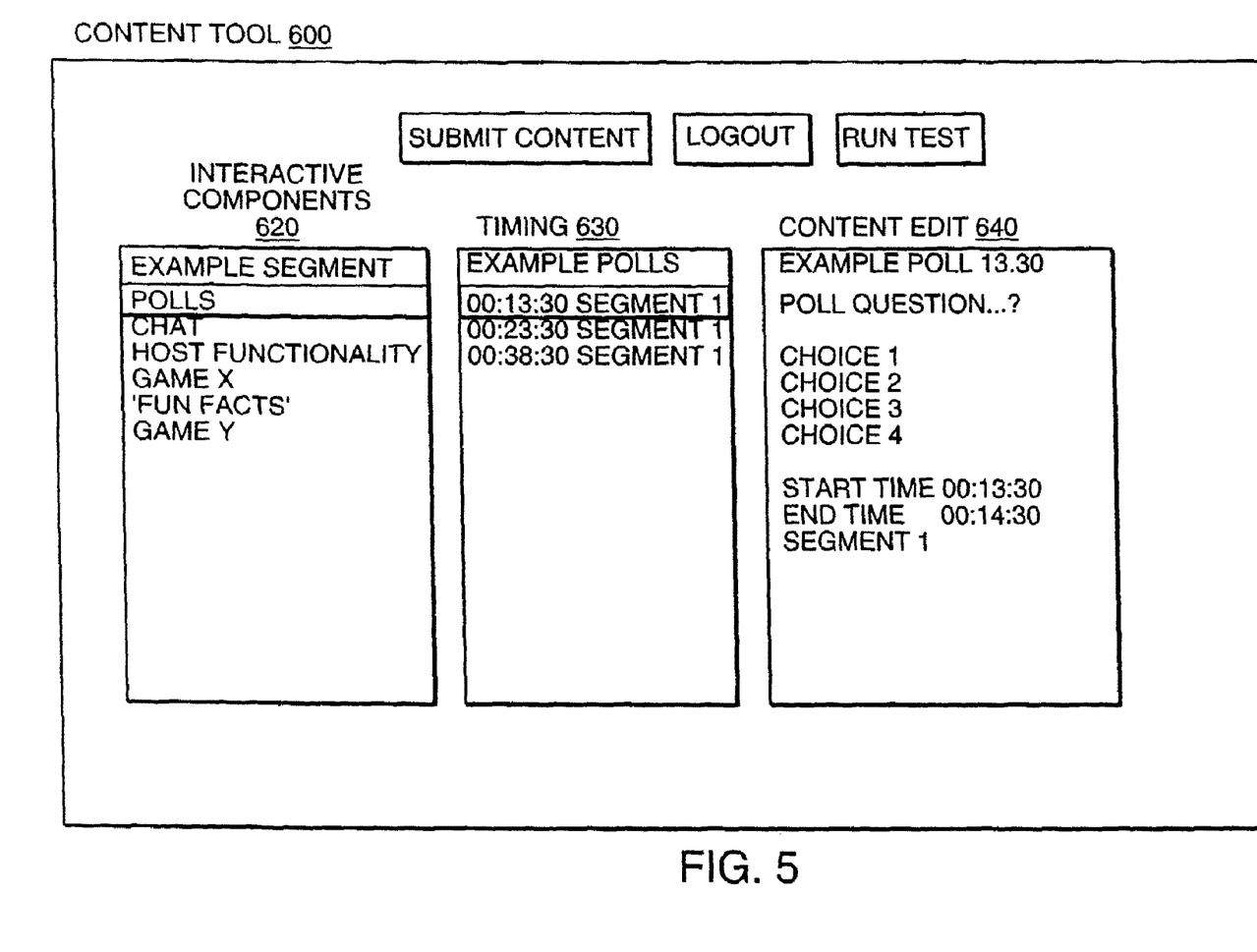
FIG. 5 shows an example of the content tool and some of its components.

As shown in FIG. 5, the content tool 600 allows producers to create and insert specific content. The content tool 600 includes a software interface specific to the event generated by the authoring composer 300. Interactive components 620 sorts the available content files according to functionality. The menu of interactive components 620 will only contain that functionality pre-selected in the event settings file 310 that was generated through authoring composer 300 (FIG. 4).

Timing component 630 allows the producer to create fields for entering in the pre-determined content (e.g., poll or fun fact) and further sorts the content fields for the functionality chosen in interactive components 620 by display time. When a particular time is selected in timing component 630, the related fields are shown in content edit 640. Content edit 640 allows the user to enter the content and adjust the timing and duration.

In the example shown in FIG. 5, the producer can use the content tool 600, for example, to select the different polls, trivia, and fun facts and then create or edit the content for display. As shown in the example of FIG. 5, the first poll is scheduled to be displayed 13.5 minutes into segment #1. When the producer selects that poll in timing 630, the content tool 600 displays a field to enter a poll question, fields to enter poll responses, and a start and end time for the poll to be displayed. This poll will be displayed for one minute. Typically after that time, the poll results are accumulated at the server and then displayed back to all the users. The content tool 600 can be used to add any number of polls, trivia, and fun facts provided that the related functionality was established through the authoring composer. In this case, for example, the authoring composer was used to determine that there would be polls provided during segment #1, and then the content tool was used to determine the number of polls, set their timing, and enter the specific content.

Figure 6:
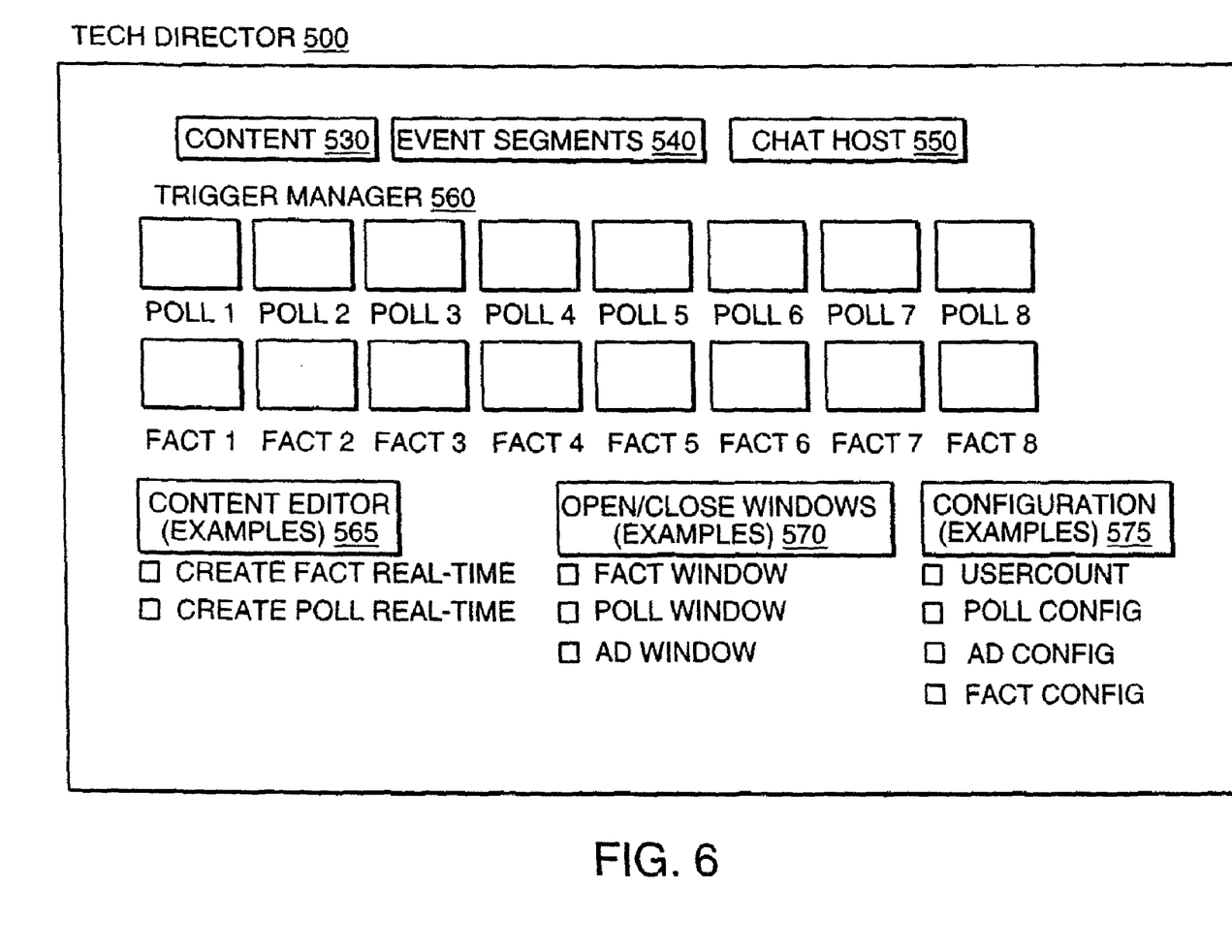
FIG. 6 is an example of the technical director and some of its components.

As discussed above and shown in FIG. 3, the content entered is used to build the technical director interface. The technical director interface varies by episode to reflect the functionality selected when the event was created and the content added by content tool 600. FIG. 6 shows an exemplary implementation of the technical director 500. The producer uses the technical director 500 to control the event while it is running. The technical director includes a software interface that can be used to generate new content during the event and/or to trigger the display of content inserted before the event using the content tool 600. Content 530 is the component that is shown in the example in FIG. 6. Content 530 has a trigger manager 560 and also the ability to generate content on the fly. In this example, eight polls and eight fun facts were created with the content tool and the buttons used to trigger them are represented by the boxes labeled Poll1 through Poll8 and Fact1 through Fact8, but there could be different numbers and there could be trivia questions and other content as well. In that case, buttons to trigger that content would be displayed in content 530 as well. These fun facts and polls could have been created through the content tool 600 before the event or some or all of them could be created with the technical director 500 during the event using content editor 565. Selecting one during an event causes the content to be sent to the event participant. The trigger manager 560 allows the producer, for example, to trigger polls and fun facts.

The poll, fun fact, trivia question, or other item of content can be selected to be viewed and edited if desired.

A content editor 565 creates the ability to generate content real-time. This ability is especially interesting in the case of live TV shows and the synchronization of on-line content with on-air broadcast, because information can be added, such as "who should be the Most Valuable Player?" during a live sporting event, or a fun fact can be added if a lesser known player becomes significant to the broadcast event. Selecting this causes a text box to open, and when ready, the entered content is sent to users.

Open/Close windows 570 allows for closing and opening windows for all clients. This causes a message to be sent to clients to cause the base software to take the desired action.

Configuration 575 is a general function that provides a mechanism to change a broad range of setting files.

Event Segment 540 provides the ability to synchronize the individual segments and/or specific content components within the segments.

Chat host 550 is a mechanism to moderate discussions, select questions and present the selected questions and answers to the audience.

Accordingly, while graphical user interfaces, drag-and-drop tools, and drop down menus are generally known for building drawings (e.g., selecting an icon with a circle to put a circle in a drawing field), software programs, and HTML content (such as tools for creating web pages), the authoring composer and content tool use tools such as these to enable a producer to create an interactive event. An interactive event under this system generally requires customized client side program and episode files, customized server side files, a customized content tool and customized content. The system described above creates all the code in these custom files and interfaces in the background while the producer uses the interface to simply create the desired event. The output not only contains the client side and server side code, but also an interface for inserting each episode's content and controlling the interactive user experience during the event.

As indicated above, the client files specific to an episode are downloaded, typically in advance of the programming or provided during the programming, to create a file or functionality specific to that content. Meanwhile, other more general client functionality, such as how different types of content are displayed generally or the ability to perform chat functions would be downloaded in advance and continue to reside on the client device through all the episodes, with the ability to be updated between episodes as desired.

Having described embodiments of the present invention, it should be apparent that modifications could be made without departing from the scope of the appended claims, and without necessarily having all the features and advantages recited herein. For example, additional interactive components can be provided and a system need not include all of the components that are included here. In addition, while the composer content tool, and technical director are described as each having certain functions, these functions can be combined or arranged differently in a content creation system. In references to software on a computer, the computer can be a single computer, networked group, server, or other device with software processing capability. All messages and content can be sent using Internet infrastructure and protocols, or over wireless or cable lines.

What is claimed is:

1. A system for creating an interactive event that includes interactive components for use with a broadcast event, the system comprising:
 a server including a display monitor; and
 one or more computer devices coupled to the server, the one or more computer devices being programmed to generate interactive components for providing to remote clients for storing prior to the broadcast event, the interactive components stored in the remote clients being responsive to messages sent from the server during the interactive event and display the stored interactive components that are indicated by the messages, the one or more computer devices further being programmed to generate a graphical user interface for hosting by the server, the graphical user interface being generated prior to the broadcast event and for displaying on the monitor coupled to the server a representation of the interactive components that are to be displayed during the interactive event, wherein the representation of a particular one of the interactive components on the monitor is configured to be actuated via the graphical user interface, wherein in response to the actuating, the server is configured to transmit to the remote clients one or more of the messages that triggers display of the particular one of the stored interactive components on the remote clients during the interactive event.

2. The system of claim 1, wherein the graphical user interface is configured to receive content during the interactive event and transmit the content for display on the remote clients.

3. The system of claim 1, wherein the interactive components are polls.

4. The system of claim 1, wherein the interactive components are trivia questions.

5. The system of claim 1, wherein the server sends the one or more messages to the remote clients via an Internet connection.

6. The system of claim 1, wherein the representation of the interactive components are icons representing individual items of interactive content to be displayed during at least a segment of the broadcast event.

7. The system of claim 1, wherein the remote clients receive the broadcast event.

8. The system of claim 7, wherein the messages are transmitted over a data communications network, and the broadcast event is broadcast over a television broadcast medium.

9. The system of claim 8, wherein the one or more messages are transmitted separately from the particular one of the interactive components.

10. The system of claim 1, wherein the one or more of the messages are created and transmitted on the fly during the broadcast event.

11. The system of claim 1, wherein the content creator creates a new graphical user interface for each new episode of the broadcast event.

12. A method for creating interactive content to be sent to remote end user receivers, the method comprising:
- generating by an authoring system a plurality of interactive components for delivery to the end user receivers for storing by the end user receivers;
- generating by the authoring system a graphical user interface having a plurality of user selectable depictions representing the plurality of interactive components;
- displaying the plurality of user selectable depictions on a display device coupled to the authoring system;
- receiving via the graphical user interface an actuation of one of the plurality of user selectable depictions representing a particular one of the stored interactive components in response to the display On the display device; and
- in response to the actuation, transmitting one or more messages that triggers display of the particular one of the stored interactive components on monitors coupled to the remote end user receivers during an interactive event.

13. The method of claim 12, wherein the messages are generated and transmitted on the fly during an interactive television program.

14. The method of claim 12, wherein the authoring system creates a new graphical user interface for each new episode of an interactive television program.

* * * * *

UNITED STATES PATENT AND TRADEMARK OFFICE
CERTIFICATE OF CORRECTION

| | | |
|---|---|---|
| PATENT NO. | : 7,886,003 B2 | Page 1 of 1 |
| APPLICATION NO. | : 12/113909 | |
| DATED | : February 8, 2011 | |
| INVENTOR(S) | : Newnam et al. | |

It is certified that error appears in the above-identified patent and that said Letters Patent is hereby corrected as shown below:

In Column 3, Line 38, delete "Whose" and insert -- whose --, therefor.

In Column 12, Line 6, in Claim 12, delete "On" and insert -- on --, therefor.

Signed and Sealed this

Seventeenth Day of May, 2011

David J. Kappos
*Director of the United States Patent and Trademark Office*